US009558741B2

(12) United States Patent
Li et al.

(10) Patent No.: US 9,558,741 B2
(45) Date of Patent: Jan. 31, 2017

(54) SYSTEMS AND METHODS FOR SPEECH RECOGNITION

(71) Applicant: Tencent Technology (Shenzhen) Company Limited, Shenzhen (CN)

(72) Inventors: Lou Li, Shenzhen (CN); Li Lu, Shenzhen (CN); Xiang Zhang, Shenzhen (CN); Feng Rao, Shenzhen (CN); Shuai Yue, Shenzhen (CN); Bo Chen, Shenzhen (CN); Jianxiong Ma, Shenzhen (CN); Haibo Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 139 days.

(21) Appl. No.: 14/291,138

(22) Filed: May 30, 2014

(65) Prior Publication Data
US 2014/0350934 A1   Nov. 27, 2014

Related U.S. Application Data

(63) Continuation of application No. PCT/CN2013/085155, filed on Oct. 14, 2013.

(30) Foreign Application Priority Data

May 14, 2013  (CN) .......................... 2013 1 0177246

(51) Int. Cl.
*G10L 15/28*   (2013.01)
*G10L 15/08*   (2006.01)
(Continued)

(52) U.S. Cl.
CPC ........... *G10L 15/083* (2013.01); *G10L 15/183* (2013.01); *G10L 15/1815* (2013.01)

(58) Field of Classification Search
CPC ........ G10L 15/06; G10L 15/08; G10L 15/083; G10L 15/187
See application file for complete search history.

(56) References Cited

U.S. PATENT DOCUMENTS 5,526,259 A * 6/1996 Kaji ................................. 704/3
6,269,335 B1 * 7/2001 Ittycheriah et al. .......... 704/270
(Continued)

FOREIGN PATENT DOCUMENTS

CN   1692405 A    11/2005
CN   101493812 A   7/2009
(Continued)

OTHER PUBLICATIONS

Patent Cooperation Treaty, International Search Report and Written Opinion of the International Searching Authority, mailed Feb. 20, 2014, in PCT/CN2013/085155.
(Continued)

*Primary Examiner* — Jialong He
(74) *Attorney, Agent, or Firm* — Jones Day

(57) ABSTRACT

Systems and methods are provided for speech recognition. For example, audio characteristics are extracted from acquired voice signals; a syllable confusion network is identified based on at least information associated with the audio characteristics; a word lattice is generated based on at least information associated with the syllable confusion network and a predetermined phonetic dictionary; and an optimal character sequence is calculated in the word lattice as a speech recognition result.

13 Claims, 8 Drawing Sheets

(51) Int. Cl.
*G10L 15/18* (2013.01)
*G10L 15/183* (2013.01)

(56) References Cited

U.S. PATENT DOCUMENTS

| | | | |
|---|---|---|---|
| 6,574,597 B1* | 6/2003 | Mohri et al. | 704/251 |
| 7,006,971 B1 | 2/2006 | Stahl et al. | |
| 7,092,883 B1* | 8/2006 | Gretter et al. | 704/242 |
| 7,831,425 B2* | 11/2010 | Acero et al. | 704/251 |
| 8,214,210 B1* | 7/2012 | Woods | 704/236 |
| 2002/0143536 A1* | 10/2002 | Chien | G10L 15/083 704/251 |
| 2007/0033003 A1* | 2/2007 | Morris | 704/9 |
| 2007/0150275 A1* | 6/2007 | Garner et al. | 704/235 |
| 2008/0052073 A1* | 2/2008 | Goto et al. | 704/251 |
| 2009/0248416 A1* | 10/2009 | Gorin et al. | 704/257 |
| 2011/0144995 A1* | 6/2011 | Bangalore et al. | 704/251 |

FOREIGN PATENT DOCUMENTS

| | | |
|---|---|---|
| CN | 101887725 A | 11/2010 |
| JP | 2005-234504 A | 9/2005 |

OTHER PUBLICATIONS

Patent Cooperation Treaty, International Preliminary Report on Patentability, issued Nov. 17, 2015, in PCT/CN2013/085155.

\* cited by examiner

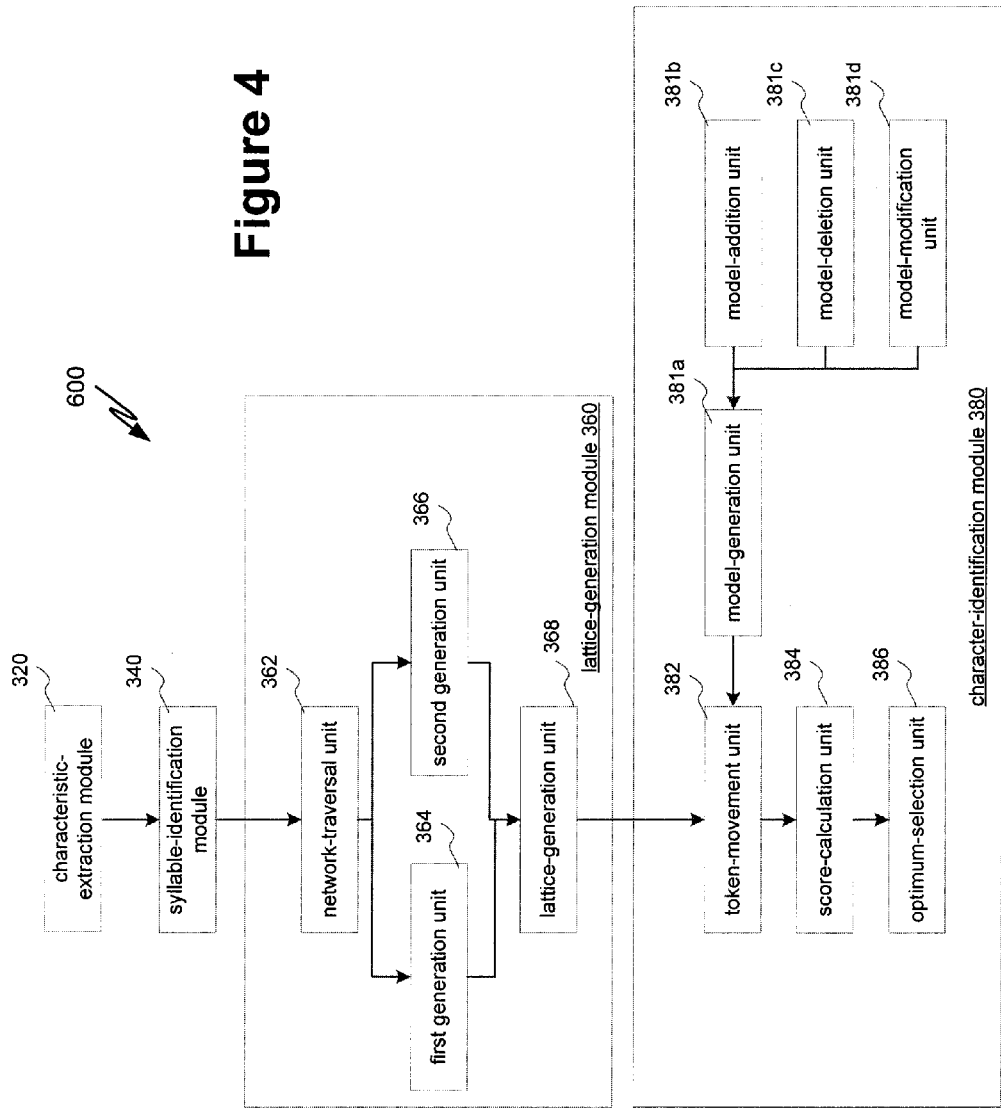

SYSTEMS AND METHODS FOR SPEECH RECOGNITION

CROSS-REFERENCES TO RELATED APPLICATIONS

This application is a continuation of International Application No. PCT/CN2013/085155, with an international filing date of Oct. 14, 2013, now pending, which claims priority to Chinese Patent Application No. 201310177246.1, filed May 14, 2013, both applications being incorporated by reference herein for all purposes.

FIELD OF THE INVENTION

Certain embodiments of the present invention are directed to computer technology. More particularly, some embodiments of the invention provide systems and methods for data processing. Merely by way of example, some embodiments of the invention have been applied to image processing. But it would be recognized that the invention has a much broader range of applicability.

BACKGROUND OF THE INVENTION

Speech recognition technology converts voice signals to corresponding character sequences and is widely used in different areas, such as human-machine interaction and audio/video search.

Conventional speech recognition technology often uses a word or a sentence as a basic identification unit. Audio characteristics are extracted from the voice signals. An optimal character sequence of the audio characteristics is calculated in a predetermined decoding search network through a Viterbi decoding. The optimal character sequence is provided as the speech identification result. Specifically, the predetermined decoding search network normally includes an acoustic model, a dictionary and a language model. The acoustic model is normally a hidden markov model (HMM) based on one phoneme or three phonemes. The dictionary includes a correspondence between words and phonemes. The language model includes a probability relationship among words in a character sequence. After the audio characteristics are input into the decoding search network, a phoneme sequence corresponding to the audio characteristics is identified using the acoustic model. A plurality of candidate words are found in the dictionary using the phoneme sequence. A sequence of candidate words with a highest probability is selected as an optimal text sequence through the probability relationship in the language model.

The above-noted conventional approach has some problems. For example, the decoding search network is established based on words. Any change in the dictionary (e.g., a collection of distinguishable words) often leads to restructuring a decoding search space, which causes inflexibility.

Hence it is highly desirable to improve the techniques for speech recognition.

BRIEF SUMMARY OF THE INVENTION

According to one embodiment, a method is provided for speech recognition. For example, audio characteristics are extracted from acquired voice signals; a syllable confusion network is identified based on at least information associated with the audio characteristics; a word lattice is generated based on at least information associated with the syllable confusion network and a predetermined phonetic dictionary; and an optimal character sequence is calculated in the word lattice as a speech recognition result.

According to another embodiment, a device for speech recognition includes a characteristic-extraction module, a syllable-identification module, a lattice-generation module, and a character-identification module. The characteristic-extraction module is configured to extract audio characteristics from acquired voice signals. The syllable-identification module is configured to identify a syllable confusion network based on at least information associated with the audio characteristics. The lattice-generation module is configured to generate a word lattice based on at least information associated with the syllable confusion network and a predetermined phonetic dictionary. The character-identification module is configured to calculating an optimal character sequence in the word lattice as a speech recognition result.

According to yet another embodiment, a terminal includes a device for speech recognition. The device includes a characteristic-extraction module, a syllable-identification module, a lattice-generation module, and a character-identification module. The characteristic-extraction module is configured to extract audio characteristics from acquired voice signals. The syllable-identification module is configured to identify a syllable confusion network based on at least information associated with the audio characteristics. The lattice-generation module is configured to generate a word lattice based on at least information associated with the syllable confusion network and a predetermined phonetic dictionary. The character-identification module is configured to calculating an optimal character sequence in the word lattice as a speech recognition result.

According to yet another embodiment, a non-transitory computer readable storage medium includes programming instructions for speech recognition. The programming instructions are configured to cause one or more data processors to execute operations. For example, audio characteristics are extracted from acquired voice signals; a syllable confusion network is identified based on at least information associated with the audio characteristics; a word lattice is generated based on at least information associated with the syllable confusion network and a predetermined phonetic dictionary; and an optimal character sequence is calculated in the word lattice as a speech recognition result.

For example, the systems and methods described herein are configured to use syllables instead of words as the basic identification units and identify an optimal character sequence according to a syllable confusion network and a word lattice so that the decoding search space does not need to be restructured in response to changes in the dictionary to provide more flexibility. In another example, the systems and methods described herein are configured to calculate a score of a token to calculate an optimal character sequence in a word lattice so as to improve the speed of identification and decoding. In yet another example, the systems and methods described herein are configured to detect activities of a token and perform subsequent calculations when the token is in an active state so as to improve the speed of identification and decoding.

Further, the decoding search network needs to be restructured when the dictionary changes in the prior method for speech recognition. If any dictionary is added, the decoding search network will also multiply, hence imposing high requirements on the storage and calculation capacities of the hardware. The method for speech recognition in this embodiment only requires adjustment of the initial at least one language model upon change of the dictionary, hence imposing comparatively lower requirements on the storage and calculation capacities of the hardware. In yet another example, the systems and methods described herein are configured to adjust a language model database upon change of one or more dictionaries so as to impose low requirements on storage and calculation capacities of hardware.

Depending upon embodiment, one or more benefits are achieved. These benefits and various additional objects, features and advantages of the present invention are fully appreciated with reference to the detailed description and accompanying drawings that follow.

BRIEF DESCRIPTION OF THE DRAWINGS

FIG. 4 is a simplified diagram showing a device for speech recognition according to another embodiment of the present invention.

DETAILED DESCRIPTION OF THE INVENTION

Figure 1:
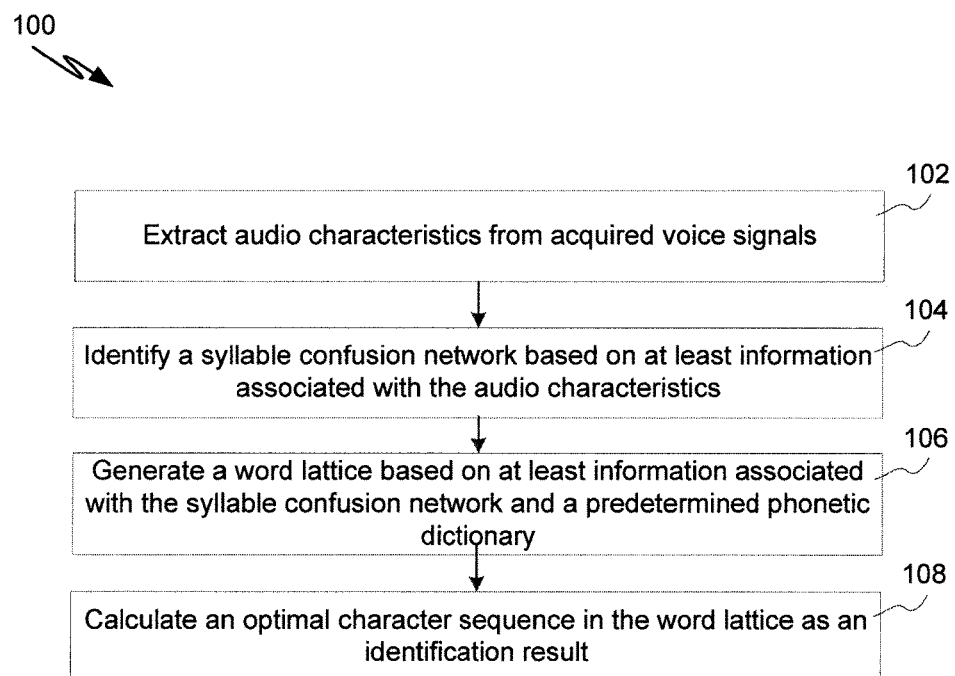
FIG. 1 is a simplified diagram showing a method for speech recognition according to one embodiment of the present invention.

FIG. 1 is a simplified diagram showing a method for speech recognition according to one embodiment of the present invention. This diagram is merely an example, which should not unduly limit the scope of the claims. One of ordinary skill in the art would recognize many variations, alternatives, and modifications. The method 100 includes at least the process 102 for extracting audio characteristics from acquired voice signals, the process 104 for identifying a syllable confusion network based on at least information associated with the audio characteristics, the process 106 for generating a word lattice based on at least information associated with the syllable confusion network and a pre-determined phonetic dictionary, and the process 108 for calculating an optimal character sequence in the word lattice as a speech recognition result.

In some embodiments, a "phoneme" refers to a minimum phonetic unit defined according to natural properties of voices. In Chinese, for instance, initial consonants, such as y, l and k, each constitute one phoneme and vowels, such as i, o and e, each constitute one phoneme. In Chinese, there are 35 phonemes. As an example, a "syllable" refers to a phonetic unit including one or more phonemes according to specific rules. In Chinese, a syllable centers on a simple or compound vowel, and often includes one initial consonant, one simple or compound a vowel and one tone. In English, a syllable centers on a vowel and often includes one vowel or one or more consonants. In Chinese, there are 22 initial consonants, 38 simple or compound vowels, more than 400 toneless syllables and about 1,300 tonal syllables. For instance, "yu" and "xiao" are toneless syllables.

In certain embodiments, a "syllable confusion network" refers to a network structure including a set of orderly nodes. For example, a side (e.g., an arc) exists only between two adjacent nodes, and one or more sides may exist between two adjacent nodes. Between two nodes, there is one slice. Each slice includes one set of syllables which include one or more syllables. Each syllable corresponds to a side between the two nodes, and each syllable also corresponds to a score. As an example, a "phonetic dictionary" provides a phonetic syllable sequence and a phoneme sequence for each character or each word in the dictionary. In certain embodiments, a "language model" refers to a mathematic model that illustrates statistical characteristics between words, normally including a probability relationship among words in a character sequence. For example, a "token" refers to a special data structure for controlling the traversal state of a lattice and for recording a path of traversal.

According to one embodiment, during the process 102, audio characteristics are extracted from acquired voice signals. For example, the audio characteristics include any of PLP (Perceptual Linear Predictive) characteristics, LPCC (Linear Prediction Cepstrum Coefficient) and MFCC (Mel Frequency Cepstrum Coefficient). In another example, during the process 104, a syllable confusion network is identified according to the audio characteristics. In yet another example, during the process 106, a word lattice is generated according to the syllable confusion network and a predetermined phonetic dictionary. In yet another example, during the process 108, an optimal character sequence in the word lattice is calculated as a speech recognition result.

Figure 2A:
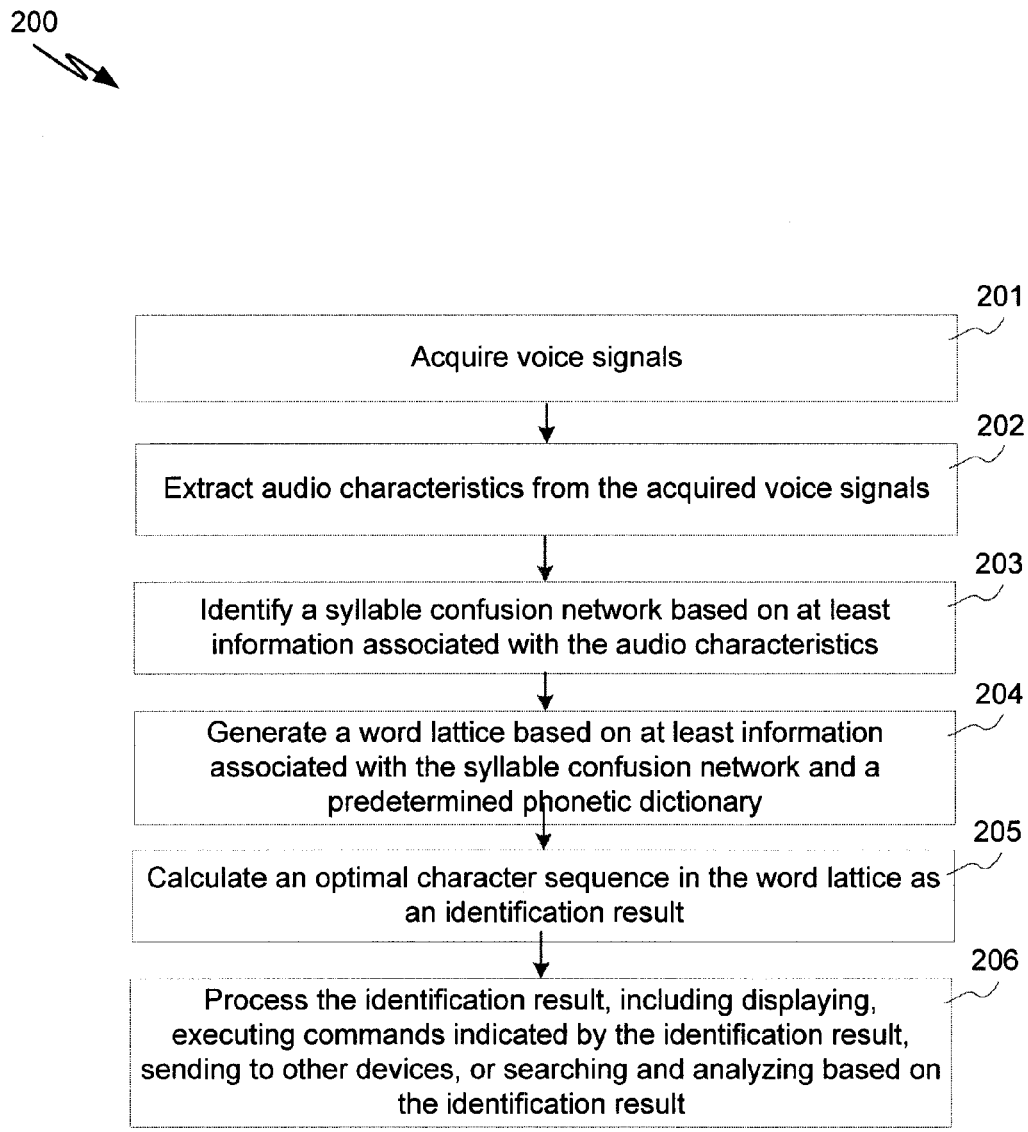
FIG. 2A is a simplified diagram showing a method for speech recognition according to another embodiment of the present invention.

FIG. 2A is a simplified diagram showing a method for speech recognition according to another embodiment of the present invention. This diagram is merely an example, which should not unduly limit the scope of the claims. One of ordinary skill in the art would recognize many variations, alternatives, and modifications. The method 200 includes at least the processes 201-206.

According to one embodiment, during the process 201, voice signals are acquired. For example, an electronic apparatus acquires voice signals. For example, the electronic apparatus acquires voice signals by reading pre-stored voice signals, acquiring voice signals via an internal or external microphone, and/or receiving via a network the voice signals transmitted by other devices. In another example, the electronic apparatus acquires the voice signals by Bluetooth, infrared communication technology or other short-distance communication technologies. For instance, if the electronic apparatus is a terminal, it can acquire pre-stored voice signals. An internal or external microphone is used to acquire the real-time voice signals input by a user. As an example, if the electronic apparatus is a server in an electronic system, the server receives the voice signals from a terminal in the electronic system via the network. In another example, the voice signals from the terminal include real-time voice signals input by a user and acquired by the terminal.

According to another embodiment, during the process 202, audio characteristics are extracted from the acquired voice signals. For example, after the electronic apparatus acquires the voice signals, it extracts audio characteristics from the acquired voice signals. As an example, the audio characteristics include PLP (Perceptual Linear Predictive)

characteristics, LPCC (Linear Prediction Cepstrum Coefficient) or MFCC (Mel Frequency Cepstrum Coefficient).

According to yet another embodiment, a process for extracting PLP characteristics includes:
1) pre-processing the voice signals, which includes pre-emphasis, framing and windowing;
2) performing Discrete Fourier Test (DFT) on the pre-processed voice signals to obtain a transient frequency spectrum;
3) performing a critical frequency band analysis on the transient frequency spectrum to obtain an interim bandwidth auditory spectrum;
4) performing equal loudness contour pre-emphasis on the interim bandwidth auditory spectrum with an ear-simulative equal loudness contour;
5) performing intensity-loudness conversion on the pre-emphasized frequency spectrum;
6) performing DFT on the converted frequency spectrum and calculating an all-pole model using a Durbin algorithm; and
7) performing an inverse spectrum calculation according to the all-pole model and finally outputting the PLP characteristics.

In one embodiment, during the process 203, a syllable confusion network is identified according to the audio characteristics. For example, the electronic apparatus can identify the syllable confusion network according to the audio characteristics. As an example, the electronic apparatus identifies a syllable confusion network that includes at least two syllable paths according to the audio characteristics. In another example; the electronic apparatus identifies a syllable confusion network that includes only an optimal syllable path according to the audio characteristics.

In some embodiments, the syllable confusion network that includes at least two syllable paths is deemed as an ordinary syllable confusion network, and the syllable confusion network that includes only the optimal syllable path is deemed as a special case of ordinary syllable confusion networks. For instance, when the electronic apparatus identifies a syllable confusion network that includes at least two syllable paths according to audio characteristics, the identification process of the whole syllabus confusion network is realized using relevant syllabus confusion network tools in a SRILM (Stanford Research Institute Language Modeling Toolkit). As an example, such a process includes:
1) identifying a corresponding syllable lattice according to the audio characteristics and an acoustic model, where the acoustic model is a predetermined hidden markov model;
2) calculating a posterior probability of each node using a forward algorithm and a backward algorithm on the syllable lattice, where the posterior probability of each node is equal to a product of a forward probability and a backward probability;
3) performing a probability trimming on the syllable lattice and recalculating the posterior probability of each node after trimming;
4) identifying a node with a highest probability on the syllable lattice and generating an optimal syllable path that includes a beginning node and an ending node using the Viterbi method, the optimal syllable path being taken as a reference path for establishing the syllable confusion network;
5) identifying the node with the highest probability in the remaining arcs of the syllable lattice and generating one optimal path through the Viterbi method;
6) comparing all arc nodes in the optimal path with each slice in the syllable confusion network, calculating the costs of deletion, addition and replacement, and introducing an arc into the reference path as one side of the syllable confusion network to yield a minimum cost; and
7) executing the operations 5) and 6) in an iterative manner until all arcs are added into the syllable confusion network.

Figure 2B:
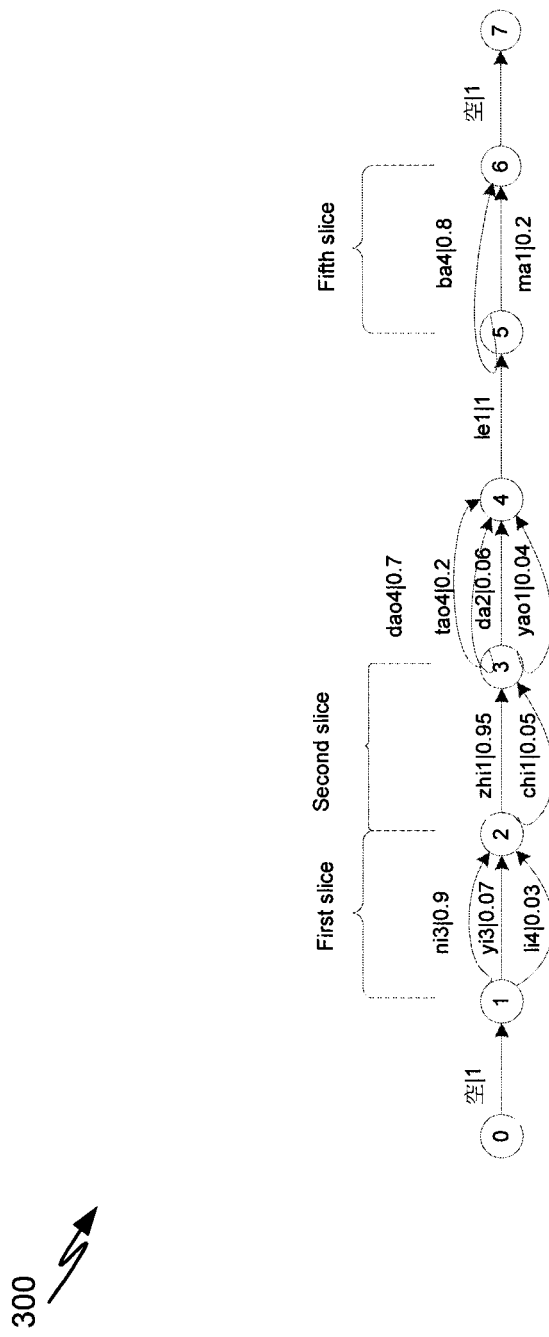
FIG. 2B is a simplified diagram showing a syllable confusion network according to one embodiment of the present invention.

FIG. 2B is a simplified diagram showing a syllable confusion network according to one embodiment of the present invention. This diagram is merely an example, which should not unduly limit the scope of the claims. One of ordinary skill in the art would recognize many variations, alternatives, and modifications.

According to one embodiment, a syllable confusion network 300 is established for a voice signal includes "你知道了吧 (English translation: do you know?)." For example, the syllable confusion network 300 includes eight nodes, e.g., a beginning node 0, a first node 1, a second node 2, a third node 3, a fourth node 4, a fifth node 5, a sixth node 6 and an ending node 7. As an example, between two adjacent nodes (except the beginning node and the ending node), there is a slice (e.g., a confusion aggregate). Each slice includes one set of syllables, and each syllable includes one or more syllables. Each syllable has one corresponding score. A sum of scores of all syllables in one slice is 1. For example, a first slice between the first node 1 and the second node 2 includes 3 syllables, i.e. ni3, yi3 and li4, corresponding to the scores of 0.9, 0.07 and 0.03, respectively. A second slice between the second node 2 and the third node 3 includes 2 syllables, i.e. zhi1 and chi2, corresponding to the scores of 0.95 and 0.05 respectively. Subsequent slices can be similarly inferred. A fifth slice is between the fifth node 5 and the sixth node 6 and includes 2 syllables, i.e. ba4 and ma1, corresponding to the scores of 0.8 and 0.2 respectively.

Referring back to FIG. 2A, during the process 204, a word lattice is generated according to the syllable confusion network and a predetermined phonetic dictionary. For example, the electronic apparatus generates a word lattice according to the syllable confusion network and the predetermined phonetic dictionary, in some embodiments.

Figure 2C:
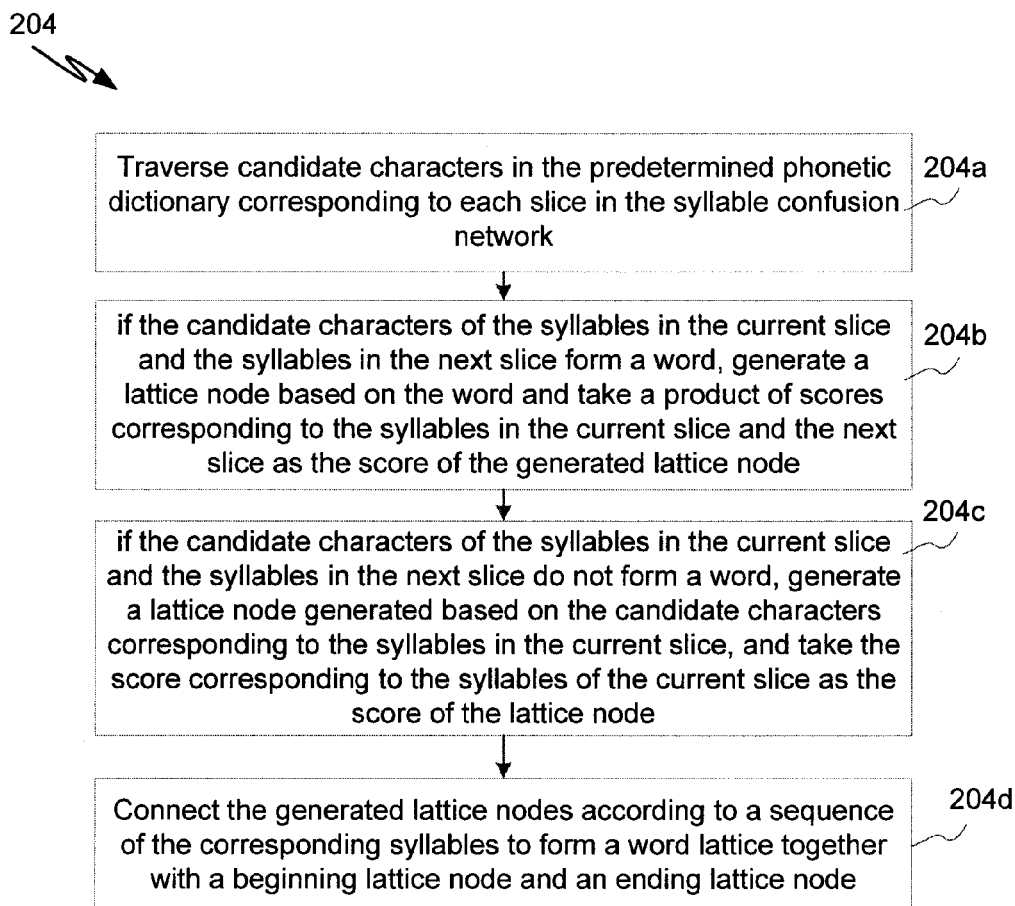
FIG. 2C is a simplified diagram showing a process of the method as shown in FIG. 2A according to one embodiment of the present invention.

FIG. 2C is a simplified diagram showing the process 204 according to one embodiment of the present invention. This diagram is merely an example, which should not unduly limit the scope of the claims. One of ordinary skill in the art would recognize many variations, alternatives, and modifications. The process 204 includes at least the sub-processes 204a-204d.

According to one embodiment, during the sub-process 204a, candidate characters are traversed in the predetermined phonetic dictionary corresponding to each slice in the syllable confusion network. For example, the syllable confusion network includes at least one sorted slice. Each slice includes one set of syllables, and each syllable has one corresponding score. As an example, the electronic apparatus needs to traverse the candidate characters in the predetermined phonetic dictionary corresponding to each slice in the syllable confusion network. The phonetic dictionary provides a phonetic syllable sequence and a phoneme sequence corresponding to each character or word in the dictionary. For instance, the phonetic syllable sequence corresponding to "你" is "ni3" and the phonetic syllable sequence corresponding to "你好" is "ni3hao3." In one example, upon arrival at a syllable in each slice of the syllable confusion network, the candidate characters corresponding to the syllable are found in the predetermined phonetic dictionary.

According to another embodiment, during the sub-process 204b, if the candidate characters of the syllables in the current slice and the syllables in the next slice form a word, a lattice node is generated based on the word and a product of scores corresponding to the syllables in the current slice and the next slice is calculated as the score of the generated lattice node.

Figure 2D:
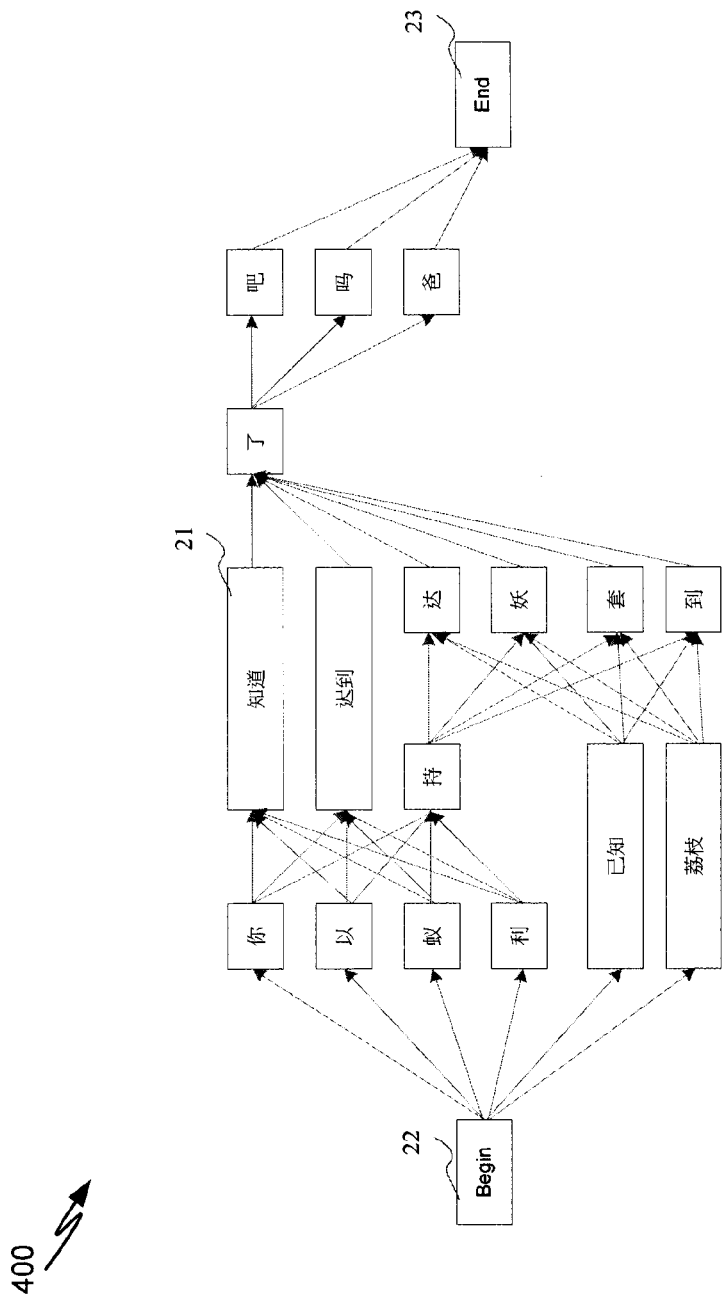
FIG. 2D is a simplified diagram showing a word lattice according to one embodiment of the present invention.

FIG. 2D is a simplified diagram showing a word lattice according to one embodiment of the present invention. This diagram is merely an example, which should not unduly limit the scope of the claims. One of ordinary skill in the art would recognize many variations, alternatives, and modifications. A word lattice 400 is shown in FIG. 2D.

Referring to FIG. 2B and FIG. 2D, if a current slice is the second slice, the syllable of the current slice is "zhi1" in some embodiments. For example, the slice following the current slice is the third slice which has the syllable "dao4." The candidate characters corresponding to these syllables "zhi1" and "dao4" in the phonetic dictionary form the word "知道" (English translation: know). As an example, the word "知道" is turned into a lattice node 21 in the word lattice 400, and a product of the score "0.95" corresponding to syllable "zhi1" and the score "0.7" corresponding to syllable "dao4" is taken as the score (e.g., 0.665) of the lattice node 21. Similarly, three other lattice nodes corresponding to the words "迟到" (English translation: late), "已知" (English translation: known), and "荔枝" (English translation: litchi) are generated as shown in FIG. 2D.

Referring back to FIG. 2C, during the sub-process 204c, if the candidate characters of the syllables in the current slice and the syllables in the next slice do not form a word, a lattice node is generated based on the candidate characters corresponding to the syllables in the current slice, and the score corresponding to the syllables of the current slice is taken as the score of the lattice node, in some embodiments. Refer to FIG. 2B and FIG. 2D, if the current slice is the first slice, the syllable of the current slice is "ni3." For example, the candidate character "你" in the phonetic dictionary corresponding to the syllable "ni3" does not form a word with the candidate characters corresponding to syllables "zhi1" and "chi2" in the next slice. The candidate character "你" corresponding to the syllable in the current slice is turned into a lattice node and the score 0.9 corresponding to the syllable in the current slice is taken as the score of the lattice node, in certain embodiments. Similarly, a plurality of lattice nodes corresponding to the candidate characters of "以", "蚁", "利", "持", "达", "妖", "套", "到", "了", "吧", "吗", "爸", etc. are generated as shown in FIG. 2D.

Referring back to FIG. 2C, during the sub-process 204d, the generated lattice nodes are connected according to a sequence of the corresponding syllables and form a word lattice together with a beginning lattice node and an ending lattice node, in some embodiments. For example, as the syllables in various slices are arranged in a specific sequence, the generated lattice nodes are connected according to the sequence of the corresponding syllables and form the word lattice 400 together with the beginning lattice node 22 and the ending lattice node 23 as shown in FIG. 2D. In some embodiments, to generate the word lattice 400, optimization is performed during the process of establishing the word lattice 400 considering the impacts of errors in addition, deletion and replacement. For instance, for the syllable "zhou1" with a corresponding candidate character "周", "走" is also taken as a lattice node considering the replacement error arising from inaccurate pronunciation in the local dialect. In other embodiments, a punitive factor is predetermined for the score of the lattice node. The score of the lattice node directly calculated from the score of the syllable is adjusted based on the punitive factor so as to optimize the score of the lattice node for subsequent calculations.

Referring back to FIG. 2A, during the process 205, an optimal character sequence is calculated in the word lattice as a speech recognition result, in some embodiments. After the word lattice is generated, the word lattice includes the beginning lattice node, the ending lattice node and at least one node path located between the beginning lattice node and the ending lattice node. The electronic apparatus calculates an optimal character sequence in the word lattice as the speech recognition result.

Figure 2E:
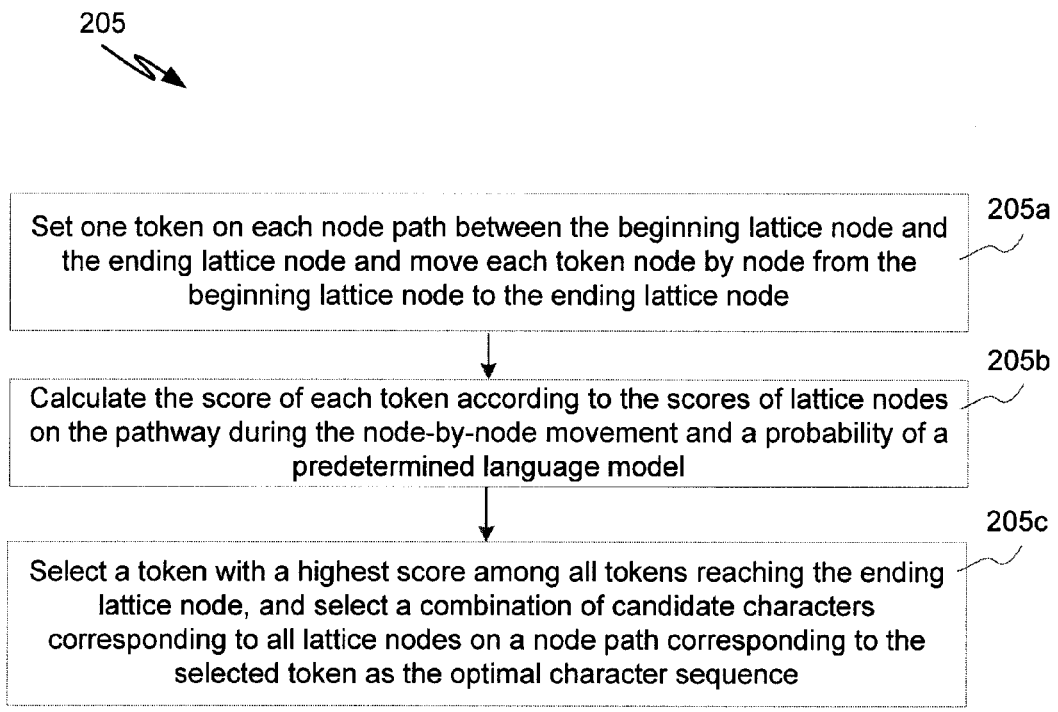
FIG. 2E is a simplified diagram showing a process of the method as shown in FIG. 2A according to one embodiment of the present invention.

FIG. 2E is a simplified diagram showing the process 205 according to one embodiment of the present invention. This diagram is merely an example, which should not unduly limit the scope of the claims. One of ordinary skill in the art would recognize many variations, alternatives, and modifications. The process 205 includes at least the sub-processes 205a-205c.

According to one embodiment, during the sub-process 205a, one token is set on each node path between the beginning lattice node and the ending lattice node and each token is moved node by node from the beginning lattice node to the ending lattice node. For example, one initial active token is set in the beginning lattice node 22 as shown in FIG. 2D and the score of the initial active token is set as 1. Then the initial active token is moved towards lattice node(s) in the next level. For example, if there are two or more lattice nodes in the next level, the initial active token is duplicated in correspondence to the paths of nodes in the next level and moved towards the lattice nodes in the level after the next level. The subsequent movements can be similarly inferred.

According to another embodiment, during the sub-process 205b, the score of each token is calculated according to the scores of lattice nodes on the pathway during the node-by-node movement and a probability of a predetermined language model. For example, if the path on token Tp is Sp0Sp1Sp2 . . . Sp3 and the word on lattice node Spi is Wpi, the score of token Tp is calculated according to the following equation:

$$\text{Score}(T_p) = \prod_{pi} \text{Score}(S_{pi}) \cdot P(W_{p0} W_{p1} \ldots W_{pk}) \quad (1)$$

wherein, Score(Spi) represents a score of the lattice node Spi on the pathway of token Tp, p represents a mark of the token Tp, and k represents the mark of the current lattice node. In addition, P(Wp0Wp1 . . . Wp3) represents the probability of the word on lattice node Spi in the language model. For instance, if the language model is a binary model, P(Wp0Wp1 . . . Wp3) is calculated according to the following equation:

$$P(W_{p0} W_{p1} \ldots W_{pk}) = P(W_{p0}) \cdot \prod_{i=1}^{k} P(W_{p,i+1} | W_{pi}) \quad (2)$$

In some embodiments, it is determined if the token is active on a real-time basis in order to reduce the calculation load. For example, the token is rejected if it is not active. The sub-process 205b further includes:

1) for each token, calculating the score of the token according to the score of the current lattice node and the probability of the predetermined language model;
2) detecting if the score of the token is smaller than a predetermined threshold; and
3) if the detection result reveals that the score of the token is not smaller than the predetermined threshold, moving the token to the next lattice node and repeating the abovementioned steps.

According to one embodiment, if the detection result reveals that the score of the token is smaller than the predetermined threshold, this token is taken as an inactive token and rejected from subsequent calculations. For example, the predetermined threshold can be adjusted. In some embodiments, a higher predetermined threshold increases the identification speed, and a lower predetermined threshold leads to more active tokens and hence more speech recognition of better accuracy.

According to another embodiment, during the sub-process 205c, a token with a highest score is selected among all tokens reaching the ending lattice node, and a combination of candidate characters corresponding to all lattice nodes on a node path corresponding to the selected token is selected as the optimal character sequence. For example, two or more tokens finally reach the ending lattice node 23 (e.g., as shown in FIG. 2D). A combination of the candidate characters corresponding to all lattice nodes on the node path corresponding to the token with a highest score. For example, the optimal character sequence is "你+知道+了+吧."

Referring back to FIG. 2A, during the process 206, the speech recognition result is processed, which includes displaying and executing commands indicated by the speech recognition result, sending to other devices and searching and analyzing based on the speech recognition, in some embodiments. For instance, if the electronic apparatus is a terminal, the terminal displays the speech recognition result, sets a reminder, opens a corresponding application, or performs weather inquiries and/or geographic location inquiries according to the speech recognition result. As an example, if the electronic apparatus is a server, the speech recognition result is sent to a corresponding terminal in the front end for subsequent utilization of the speech recognition result.

In certain embodiments, before the process 205, the electronic apparatus generates and stores at least one language model according to different dictionaries. For example, it is only necessary to adjust the language model accordingly if the dictionary has any changes. As an example, if one dictionary is added, a new language model is generated according to the added dictionary and the new language model is added to the language model database. If one dictionary is deleted, a language model corresponding to the deleted dictionary is deleted from the language model database. If one dictionary is modified, a new language model is generated according to the modified dictionary and the new language model is added to the language model database. Or, if one dictionary is modified, the language model corresponding to the modified dictionary in the language model database is modified.

In some embodiments, the method 100 and/or the method 200 are executed in an electronic apparatus. For example, the electronic apparatus includes a smart phone, a smart TV, a tablet computer, an electronic reader or any other terminals. In another example, the electronic apparatus includes a server for an electronic system capable of speech recognition. As an example, the electronic system includes not only the server, but also one or more terminals in the front end. The terminal and the server are connected through a wired network or a wireless network.

Figure 3:
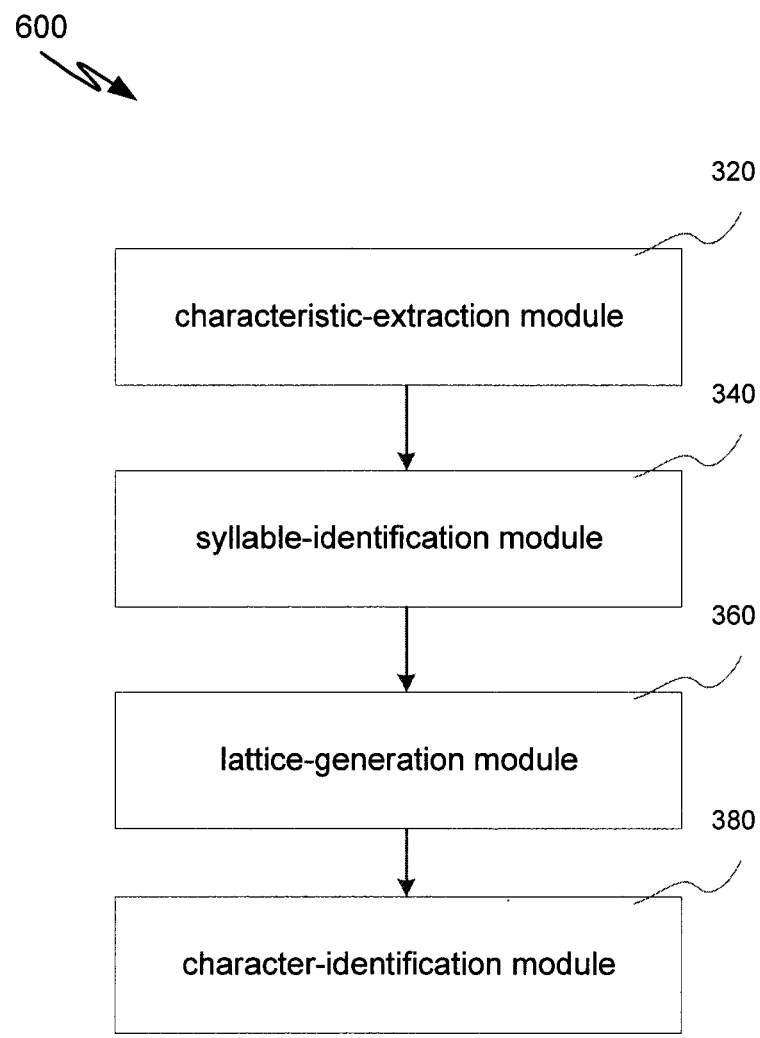
FIG. 3 is a simplified diagram showing a device for speech recognition according to one embodiment of the present invention.

FIG. 3 is a simplified diagram showing a device for speech recognition according to one embodiment of the present invention. This diagram is merely an example, which should not unduly limit the scope of the claims. One of ordinary skill in the art would recognize many variations, alternatives, and modifications. The device 600 includes: a characteristic-extraction module 320, a syllable-identification module 340, a lattice-generation module 360 and a character-identification module 380.

According to one embodiment, the characteristic-extraction module 320 is configured to extract audio characteristics from acquired voice signals. For example, the syllable-identification module 340 is configured to identify a syllable confusion network based on at least information associated with the audio characteristics. In another example, the lattice-generation module 360 is configured to generate a word lattice based on at least information associated with the syllable confusion network and a predetermined phonetic dictionary. The character-identification module 380 is configured to calculating an optimal character sequence in the word lattice as a speech recognition result.

FIG. 4 is a simplified diagram showing the device 600 for speech recognition according to another embodiment of the present invention. This diagram is merely an example, which should not unduly limit the scope of the claims. One of ordinary skill in the art would recognize many variations, alternatives, and modifications.

According to one embodiment, the syllable-identification module 340 is configured to identify the syllable confusion network that includes two or more syllable paths based on at least information associated with the audio characteristics. According to another embodiment, the syllable-identification module 340 is configured to identify the syllable confusion network that includes an optimal syllable path based on at least information associated with the audio characteristics.

In one embodiment, the syllable confusion network includes one or more sorted slices, a slice including a set of syllables, a syllable corresponding to a score. For example, the lattice-generation module 360 includes: a network-traversal unit 362, a first generation unit 364, a second generation unit 366 and a lattice-generation unit 368. As an example, the network-traversal unit 362 is configured to traverse candidate characters in the predetermined phonetic dictionary corresponding to the slices in the syllable confusion network. The first generation unit 364 is configured to, in response to a first candidate character corresponding to a first syllable in a current slice and a second candidate character corresponding to a second syllable in a next slice forming a word, generate a first lattice node based on at least information associated with the word, and determine a first node score for the first lattice node based on at least information associated with a product of a first score corresponding to the first syllable in the current slice and a second score corresponding to the second syllable in the next slice. As an example, the second generation unit 366 is configured to, in response to the first candidate character corresponding to the first syllable in the current slice and the second candidate character corresponding to the second syllable in the next slice not forming a word, generate a second lattice node based on at least information associated with the first candidate character and determine a second node score for the second lattice node based on at least information associated with the first score. The lattice-generation unit 368 is configured to connect the first lattice node and the second lattice node based on at least information associated with a sequence related to the first syllable and the second syllable and generate the word lattice based on at least information associated with the first lattice node, the second lattice node, a beginning lattice node and an ending lattice node.

In another embodiment, the word lattice includes a beginning lattice node, an ending lattice node, and one or more node paths located between the beginning lattice node and the ending lattice node. For example, the character-identification module 380 includes: a token-movement unit 382, a score-calculation unit 384 and an optimum-selection unit 386. As an example, the token-movement unit 382 is configured to, for a node path, set a token on the node path between the beginning lattice node and the ending lattice node and move the token from the beginning lattice node to the ending lattice node along the node path. The score-calculation unit 384 is configured to calculate a token score of the token based on at least information associated with one or more node scores related to one or more lattice nodes on the node path and a probability related to a predetermined language model. The optimum-selection unit 386 is configured to select a final token with a highest token score and select a combination of final candidate characters corresponding to one or more final lattice nodes on a final node path related to the final token as the optimal character sequence.

In yet another embodiment, the score-calculation unit 384 includes: a calculation subunit, a detection subunit and a movement subunit. For example, the calculation subunit is configured to calculate the token score of the token based on at least information associated with a current node score related to a current lattice node and the probability of the predetermined language model. The detection subunit is configured to detect whether the token score is smaller than a predetermined threshold. As an example, the movement subunit is configured to, in response to the token score being no smaller than the predetermined threshold, move the token to a next lattice node. In some embodiments, the calculation subunit and the detection subunit are configured to, in response to the token score being no smaller than the predetermined threshold, repeat calculating the token score of the token based on at least information associated with a current node score related to a current lattice node and the probability of the predetermined language model and detecting whether the token score is smaller than a predetermined threshold.

According to one embodiment, the character-identification module 380 further includes: a model-generation unit 381a, a model-addition unit 381b, a model-deletion unit 381c and a model-modification unit 381d. For example, the model-generation unit 381a is configured to generate a language model database including one or more original language models based on at least information associated with a dictionary database including one or more original dictionaries. The model-addition unit 381b is configured to, in response to a first dictionary being added to the dictionary database, generate a first language model based on at least information associated with the first dictionary and add the first language model to the language model database. The model-deletion unit 381c is configured to, in response to a second dictionary being deleted from the dictionary database, delete a second language model corresponding to the second dictionary from the language model database. As an example, the model-modification unit 381d is configured to, in response to a third dictionary being modified, generate a third language model based on at least information associated with the third dictionary and add the third language model to the language model database; or modify a fourth language model corresponding to the third dictionary in the language model database.

In some embodiments, the device 600 is included in an electronic apparatus through software and/or hardware. For example, the electronic apparatus includes a smart phone, a smart TV, a tablet computer, an electronic reader or any other terminals. In another example, the electronic apparatus includes a server for an electronic system capable of speech recognition. As an example, the electronic system includes not only the server, but also one or more terminals in the front end. The terminal and the server are connected through a wired network or a wireless network.

According to one embodiment, a method is provided for speech recognition. For example, audio characteristics are extracted from acquired voice signals; a syllable confusion network is identified based on at least information associated with the audio characteristics; a word lattice is generated based on at least information associated with the syllable confusion network and a predetermined phonetic dictionary; and an optimal character sequence is calculated in the word lattice as a speech recognition result. For example, the method is implemented according to at least FIG. 1, FIG. 2A, FIG. 2B, FIG. 2C, FIG. 2D, and/or FIG. 2E.

According to another embodiment, a device for speech recognition includes a characteristic-extraction module, a syllable-identification module, a lattice-generation module, and a character-identification module. The characteristic-extraction module is configured to extract audio characteristics from acquired voice signals. The syllable-identification module is configured to identify a syllable confusion network based on at least information associated with the audio characteristics. The lattice-generation module is configured to generate a word lattice based on at least information associated with the syllable confusion network and a predetermined phonetic dictionary. The character-identification module is configured to calculating an optimal character sequence in the word lattice as a speech recognition result. For example, the device is implemented according to at least FIG. 3, and/or FIG. 4.

According to yet another embodiment, a terminal includes a device for speech recognition. The device includes a characteristic-extraction module, a syllable-identification module, a lattice-generation module, and a character-identification module. The characteristic-extraction module is configured to extract audio characteristics from acquired voice signals. The syllable-identification module is configured to identify a syllable confusion network based on at least information associated with the audio characteristics. The lattice-generation module is configured to generate a word lattice based on at least information associated with the syllable confusion network and a predetermined phonetic dictionary. The character-identification module is configured to calculating an optimal character sequence in the word lattice as a speech recognition result. For example, the terminal is implemented according to at least FIG. 3, and/or FIG. 4.

According to yet another embodiment, a non-transitory computer readable storage medium includes programming instructions for speech recognition. The programming instructions are configured to cause one or more data processors to execute operations. For example, audio characteristics are extracted from acquired voice signals; a syllable confusion network is identified based on at least information associated with the audio characteristics; a word lattice is generated based on at least information associated with the syllable confusion network and a predetermined phonetic dictionary; and an optimal character sequence is calculated in the word lattice as a speech recognition result. For example, the storage medium is implemented according to at least FIG. 1, FIG. 2A, FIG. 2B, FIG. 2C, FIG. 2D, and/or FIG. 2E.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention is combined.

Additionally, the methods and systems described herein is implemented on many different types of processing devices by program code comprising program instructions that are executable by the device processing subsystem. The software program instructions includes source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) is stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods is provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein is connected directly or indirectly to each other in order to allow the flow of data needed for their operations. It is also noted that a module or processor includes but is not limited to a unit of code that performs a software operation, and is implemented for example as a subroutine unit of code, or as a software function unit of code, or as an object (as in an object-oriented paradigm), or as an applet, or in a computer script language, or as another type of computer code. The software components and/or functionality is located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what is claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features is described above as acting in certain combinations and even initially claimed as such, one or more features from a claimed combination can in some cases be excised from the combination, and the claimed combination is directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing is advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for speech recognition, the method comprising:
  extracting, by one or more data processors, audio characteristics from acquired voice signals;
  identifying, by the one or more data processors, a syllable confusion network based on at least information associated with the audio characteristics;
  generating, by the one or more data processors, a word lattice based on at least information associated with the syllable confusion network and a predetermined phonetic dictionary; and
  calculating, by the one or more data processors, an optimal character sequence in the word lattice as a speech recognition result of the acquired voice signals;
  wherein the syllable confusion network includes one or more sorted slices, wherein each of the one or more sorted slices includes a set of syllables, and wherein each syllable in the set of syllables is associated with a score; and wherein the generating a word lattice based on at least information associated with the syllable confusion network and a predetermined phonetic dictionary includes:
  traversing candidate characters in the predetermined phonetic dictionary corresponding to the slices in the syllable confusion network;
  in response to a first candidate character corresponding to a first syllable in a current slice and a second candidate character corresponding to a second syllable in a next slice forming a word,
    generating a first lattice node based on at least information associated with the word; and
    determining a first node score for the first lattice node based on a first score corresponding to the first syllable in the current slice and a second score corresponding to the second syllable in the next slice;
  in response to the first candidate character corresponding to the first syllable in the current slice and the second candidate character corresponding to the second syllable in the next slice not forming a word,
    generating a second lattice node based on at least information associated with the first candidate character; and
    determining a second node score for the second lattice node based on the first score.

2. The method of claim 1, wherein the identifying a syllable confusion network based on at least information associated with the audio characteristics includes:
  identifying the syllable confusion network that includes two or more syllable paths based on at least information associated with the audio characteristics; or
  identifying the syllable confusion network that includes an optimal syllable path based on at least information associated with the audio characteristics.

3. The method of claim 1, wherein:
  the generating a word lattice based on at least information associated with the syllable confusion network and a predetermined phonetic dictionary includes:
    connecting the first lattice node and the second lattice node based on at least information associated with a sequence related to the first syllable and the second syllable; and
    generating the word lattice based on at least information associated with the first lattice node, the second lattice node, a beginning lattice node and an ending lattice node.

4. The method of claim 1, wherein:
  the word lattice includes a beginning lattice node, an ending lattice node, and one or more node paths located between the beginning lattice node and the ending lattice node; and
  the calculating an optimal character sequence in the word lattice includes:
    for each node path of the one or more node paths,
      setting a token on the node path between the beginning lattice node and the ending lattice node;
      moving the token from the beginning lattice node to the ending lattice node along the node path; and
      calculating a token score of the token based on at least information associated with one or more node scores related to one or more lattice nodes on the node path and a probability related to a predetermined language model;
    selecting a final token with a highest token score; and
    selecting a combination of final candidate characters corresponding to one or more final lattice nodes on a final node path related to the final token as the optimal character sequence.

5. The method of claim 4, wherein the calculating a token score of the token based on at least information associated with one or more node scores related to one or more lattice nodes on the node path and a probability related to a predetermined language model includes:
  calculating the token score of the token based on at least information associated with a current node score related to a current lattice node and the probability of the predetermined language model;
  detecting whether the token score is smaller than a predetermined threshold; and
  in response to the token score being no smaller than the predetermined threshold,
    moving the token to a next lattice node; and
    repeating the calculating the token score of the token based on at least information associated with a current node score related to a current lattice node and the probability of the predetermined language model, and the detecting whether the token score is smaller than a predetermined threshold.

6. The method of claim 4, further comprising:
  generating a language model database including one or more original language models based on at least information associated with a dictionary database including one or more original dictionaries;
  in response to a first dictionary being added to the dictionary database,
    generating a first language model based on at least information associated with the first dictionary; and
    adding the first language model to the language model database;
  in response to a second dictionary being deleted from the dictionary database, deleting a second language model corresponding to the second dictionary from the language model database; and
  in response to a third dictionary being modified,
    generating a third language model based on at least information associated with the third dictionary; and
    adding the third language model to the language model database; or
    modifying a fourth language model corresponding to the third dictionary in the language model database.

7. A device for speech recognition, includes:
  one or more data processors; and
  a computer-readable storage medium storing a characteristic-extraction module, a syllable-identification module, a lattice-generation module, and a character-identification module configured to be executed by the one or more data processors;
  wherein:
    the characteristic-extraction module configured to extract audio characteristics from acquired voice signals;
    the syllable-identification module configured to identify a syllable confusion network based on at least information associated with the audio characteristics;
    the lattice-generation module configured to generate a word lattice based on at least information associated with the syllable confusion network and a predetermined phonetic dictionary; and the character-identification module configured to calculating an optimal character sequence in the word lattice as a speech recognition result of the acquired voice signals;

wherein the syllable confusion network includes one or more sorted slices, wherein each of the one or more sorted slices includes a set of syllables, and wherein each syllable in the set of syllables is associated with a score; and wherein the lattice-generation module includes:
 a network-traversal unit configured to traverse candidate characters in the predetermined phonetic dictionary corresponding to the slices in the syllable confusion network;
 a first generation unit configured to, in response to a first candidate character corresponding to a first syllable in a current slice and a second candidate character corresponding to a second syllable in a next slice forming a word, generate a first lattice node based on at least information associated with the word, and determine a first node score for the first lattice node based on a first score corresponding to the first syllable in the current slice and a second score corresponding to the second syllable in the next slice;
 a second generation unit configured to, in response to the first candidate character corresponding to the first syllable in the current slice and the second candidate character corresponding to the second syllable in the next slice not forming a word, generate a second lattice node based on at least information associated with the first candidate character and determine a second node score for the second lattice node based on the first score.

8. The device of claim 7, wherein:
the syllable-identification module is configured to identify the syllable confusion network that includes two or more syllable paths based on at least information associated with the audio characteristics; or
the syllable-identification module is configured to identify the syllable confusion network that includes an optimal syllable path based on at least information associated with the audio characteristics.

9. The device of claim 7, wherein:
the lattice-generation module includes:
 a lattice-generation unit configured to connect the first lattice node and the second lattice node based on at least information associated with a sequence related to the first syllable and the second syllable and generate the word lattice based on at least information associated with the first lattice node, the second lattice node, a beginning lattice node and an ending lattice node.

10. The device of claim 7, wherein:
the word lattice includes a beginning lattice node, an ending lattice node, and one or more node paths located between the beginning lattice node and the ending lattice node; and
the character-identification module includes:
 a token-movement unit configured to, for each node path of the one or more node paths, set a token on the node path between the beginning lattice node and the ending lattice node and move the token from the beginning lattice node to the ending lattice node along the node path;
 a score-calculation unit configured to calculate a token score of the token based on at least information associated with one or more node scores related to one or more lattice nodes on the node path and a probability related to a predetermined language model; and
 an optimum-selection unit configured to select a final token with a highest token score and select a combination of final candidate characters corresponding to one or more final lattice nodes on a final node path related to the final token as the optimal character sequence.

11. The device of claim 10, wherein the score-calculation unit includes:
 a calculation subunit configured to calculate the token score of the token based on at least information associated with a current node score related to a current lattice node and the probability of the predetermined language model;
 a detection subunit configured to detect whether the token score is smaller than a predetermined threshold; and
 a movement subunit configured to, in response to the token score being no smaller than the predetermined threshold, move the token to a next lattice node;
wherein the calculation subunit and the detection subunit are configured to, in response to the token score being no smaller than the predetermined threshold, repeat calculating the token score of the token based on at least information associated with a current node score related to a current lattice node and the probability of the predetermined language model and detecting whether the token score is smaller than a predetermined threshold.

12. The device of claim 10, wherein the character-identification module further includes:
 a model-generation unit configured to generate a language model database including one or more original language models based on at least information associated with a dictionary database including one or more original dictionaries;
 a model-addition unit configured to, in response to a first dictionary being added to the dictionary database, generate a first language model based on at least information associated with the first dictionary and add the first language model to the language model database;
 a model-deletion unit configured to, in response to a second dictionary being deleted from the dictionary database, delete a second language model corresponding to the second dictionary from the language model database; and
 a model-modification unit configured to, in response to a third dictionary being modified,
  generate a third language model based on at least information associated with the third dictionary and add the third language model to the language model database; or
  modify a fourth language model corresponding to the third dictionary in the language model database.

13. A non-transitory computer readable storage medium comprising programming instructions for speech recognition, the programming instructions configured to cause one or more data processors to execute operations comprising:
 extracting audio characteristics from acquired voice signals;
 identifying a syllable confusion network based on at least information associated with the audio characteristics;

generating a word lattice based on at least information associated with the syllable confusion network and a predetermined phonetic dictionary; and calculating an optimal character sequence in the word lattice as a speech recognition result of the acquired voice signals;

wherein the syllable confusion network includes one or more sorted slices, wherein each of the one or more sorted slices includes a set of syllables, and wherein each syllable in the set of syllables is associated with a score; and wherein the generating a word lattice based on at least information associated with the syllable confusion network and a predetermined phonetic dictionary includes:

traversing candidate characters in the predetermined phonetic dictionary corresponding to the slices in the syllable confusion network;

in response to a first candidate character corresponding to a first syllable in a current slice and a second candidate character corresponding to a second syllable in a next slice forming a word, generating a first lattice node based on at least information associated with the word; and determining a first node score for the first lattice node based on a first score corresponding to the first syllable in the current slice and a second score corresponding to the second syllable in the next slice;

in response to the first candidate character corresponding to the first syllable in the current slice and the second candidate character corresponding to the second syllable in the next slice not forming a word, generating a second lattice node based on at least information associated with the first candidate character; and determining a second node score for the second lattice node based on the first score.

* * * * *